United States Patent [19]

Patel

[11] Patent Number: 5,133,977
[45] Date of Patent: Jul. 28, 1992

[54] CHEWING GUM WITH IMPROVED SWEETNESS PROFILE INCORPORATING FINELY GROUND BULK SWEETENER WITHOUT STARCH

[75] Inventor: Mansukh M. Patel, Downers Grove, Ill.

[73] Assignee: Wm. Wrigley Jr. Company, Chicago, Ill.

[21] Appl. No.: 607,983

[22] Filed: Nov. 1, 1990

Related U.S. Application Data

[63] Continuation-in-part of Ser. No. 432,519, Nov. 7, 1989, abandoned.

[51] Int. Cl.$^5$ .............................................. A23G 3/30
[52] U.S. Cl. ........................................ 426/3; 426/658
[58] Field of Search ...................................... 426/3–6, 426/658

[56] References Cited

U.S. PATENT DOCUMENTS

| | | | |
|---|---|---|---|
| 2,060,461 | 11/1936 | Dyckman | 426/3 |
| 2,265,465 | 12/1941 | Wilson | 426/3 |
| 3,085,048 | 10/1971 | Bush | 426/3 |
| 3,795,744 | 3/1974 | Ogawa et al. | 426/3 |
| 3,982,023 | 9/1976 | Bahoshy | 426/3 |
| 4,045,581 | 8/1977 | Mackay et al. | 426/3 |
| 4,293,570 | 10/1981 | Vadasz | 426/3 |
| 4,316,915 | 2/1982 | Friello et al. | 426/5 |
| 4,448,789 | 5/1984 | Yang | 426/5 |
| 4,507,511 | 3/1985 | Reiff et al. | 426/548 X |
| 4,536,396 | 8/1985 | Stephens, Jr. et al. | 426/3 X |
| 4,556,565 | 12/1985 | Arima et al. | 426/3 |
| 4,588,592 | 5/1986 | Elias | 426/5 |
| 4,605,794 | 8/1986 | Reiff et al. | 426/548 X |
| 4,803,083 | 2/1989 | Chapdelaine | 426/3 |
| 4,863,745 | 9/1989 | Zibell | 426/5 |

FOREIGN PATENT DOCUMENTS

WO88/06845 9/1988 PCT Int'l Appl. .
WO89/07895 9/1989 PCT Int'l Appl. .

*Primary Examiner*—Jeanette Hunter
*Attorney, Agent, or Firm*—Willian Brinks Olds Hofer Gilson & Lione

[57] ABSTRACT

Chewing gum compositions utilizing finely ground bulk sweeteners and methods of producing the compositions are disclosed. The gum compositions comprise about 5% to about 50% gum base, about 0.5% to about 3% flavor and about 40% to about 90% of a powdered bulk sweetener (preferably sucrose) wherein the powdered bulk sweetener has a particle size distribution such that at least about 60% of the powdered bulk sweetener passes through a U.S. Standard #325 sieve. Preferably 70%, or even 90%, of the finely ground bulk sweetener passes through a U.S. Standard #325 sieve. In the preferred method of producing the gum, the finely ground bulk sweetener is sifted just prior to being mixed with the gum base, or incorporates a non-starch flow agent preblended with the bulk sweetener.

22 Claims, No Drawings

CHEWING GUM WITH IMPROVED SWEETNESS PROFILE INCORPORATING FINELY GROUND BULK SWEETENER WITHOUT STARCH

CROSS REFERENCE TO RELATED APPLICATIONS

This application is a continuation-in-part application of U.S. pat application Ser. No. 07/432,519, filed Nov. 7, 1989, now abandoned.

BACKGROUND OF THE INVENTION

The present invention relates to chewing gum compositions and methods of producing chewing gum. More particularly, the invention relates to the use of a finely ground, powdered bulk sweetener in chewing gum.

Chewing gum compositions typically include gum base, a powdered bulk sweetener and flavor, as well as other optional ingredients such as softeners, colors, etc. Conventional powdered sugar, a typical powdered bulk sweetener used in chewing gum, has a particle size distribution such that about 99% passes through a U.S. Standard #100 sieve and about 25% passes through a U.S. Standard #325 sieve.

The perceived sweetness from chewing gum is a function of the gum's sweetener release rates and factors involved in sensory perception (including both physiological and psychological factors). For example, at low levels of sweetener, doubling the amount of sweetener in a composition may well produce a sensory perception of twice the sweetness of the original composition. However, at higher levels of sweetener, doubling the amount of sweetener may produce a negligible perceived difference, perhaps because the sensory mechanism is already near or at a maximum, or even an overloaded situation.

The rate of sweetener and flavor release during mastication is a function of a number of factors. Primarily, however, the release rate of an ingredient is a function of the ingredient's solubility and the amount of the ingredient remaining in the gum at the time of interest. Since the concentration of sweetener is highest initially, the sweetener release rate starts out at a peak level, and decreases with time. Improving the sweetness profile and lengthening this sweetness lasting has long been a goal of chewing gum producers. The use of higher levels of gum base (and comparable increases in flavor level) produces slight increases in flavor and sweetness lasting, but significant reductions in the initial sweetness level. Therefore, higher gum base concentrations have not typically been used to increase sweetness lasting.

SUMMARY OF THE INVENTION

It has now been found that chewing gums may be made which have an improved sweetness profile by making them from a finely ground, powdered bulk sweetener. For example, using sucrose with a particle size distribution such that at least about 60% passes through a U.S. Standard #325 sieve provides gum with longer lasting sweetness with little or no reduction in initial sweetness perception. Thus, gums of the present invention comprise about 5% to about 50% gum base, about 0.5% to about 3% flavor, and about 40% to about 90% of a powdered bulk sweetener which has a particle size distribution such that at least about 60% of the powdered bulk sweetener passes through a U.S. Standard #325 sieve. The benefit of the present invention can be maximized by increasing the base content of the gum to at least 25%, and preferably to at least 30%, with a comparable increase in flavor level.

DETAILED DESCRIPTION OF THE PREFERRED EMBODIMENTS OF THE INVENTION

As used herein, the term chewing gum includes conventional chewing gum, bubble gum and other similar compositions.

The present invention is useful in making all types of chewing gums, including low moisture gums, non-tack gums, conventional sugar gums, bubble gums, etc. Any gum which has a large amount of powdered, bulk sweetener is subject to improvement by the present invention.

In general terms, the composition of the present invention will comprise about 5% to about 50%, and preferably about 20% to about 35%, gum base; about 0.5% to about 3%, and preferably about 1% to about 2.5%, flavor and about 40% to about 90%, and preferably about 45% to about 65%, of a powdered bulk sweetener having a particle size such that at least about 60% of the powdered bulk sweetener passes through a U.S. Standard #325 sieve. Preferably at least 70%, and most preferably at least 90%, of the powdered bulk sweetener will pass through a U.S. Standard #325 sieve.

The term bulk sweetener as used herein refers to those sweeteners which have a sweetness in the same range of magnitude as sucrose. Generally such bulk sweetness are not more than three times as sweet as sucrose. The sweetest commonly available bulk sweetener is fructose.

The preferred bulk sweetener for use in the present invention is sucrose. Other bulk sweeteners with similar sweetness (such as fructose and xylitol) and mixtures of such sweeteners, are suitable for use in the present invention. Sweeteners with lower sweetness may be used if used in such quantities that the sweetness lasting is perceptible by using the sweetener in its finely ground state.

Suitable sucrose powder can be prepared by grinding either course beet or cane sugar in a high speed impact mill, such as a Bauermeister Turbo Mill or a Mikropul hammer mill. Suitable sugar may also be purchased from commercial suppliers as 10×to 14×sugar. The 10×sugar, which is preferred, passes at least 75% through a #325 sieve. A finer 12X sugar will pass at least 95% through the #325 sieve and would be more preferred than 10×sugar except for difficulties in handling and its tendency to produce sugar spots in the finished gum.

Many commercially available 10×or finer sugars contain anti-caking agents. For example, confectioners' sugar is a finely ground sugar with starch as an anticaking agent. It has been discovered that the starch used in such sugars tends to dry gum out, absorb a portion of the flavor, and adversely affects the mouth feel of the gum. Therefore, when procuring commercially ground sugar, a 10×sugar without starch should be specified so that the bulk sweetener will be essentially free of starch.

The finely ground sugar is used as a complete or partial replacement for the usual, coarser powdered sugar. It is preferred that the finely ground sugar be used exclusively. If a blend of fine and regular sugar is used, the blend should be such that at least 60% of the blend passes through a U.S. standard #325 sieve.

Of course, additional powdered bulk sweeteners, such as dextrose, may be incorporated into the gums in their conventional particle sizes, so long as at least 40% of the gum is made from the finely ground bulk sweetener with the particle size distribution such that at least 60% passes through a U.S. Standard #325 sieve. When additional dextrose is used, the gum will preferably comprise about 5% to about 20% dextrose.

Other liquid sweeteners, such as corn syrup, sorbitol solution, hydrogenated starch hydrolysate solution or the like, may also be used in the chewing gum of the present invention. Preferably the chewing gum will contain about 4% to about 20% of these liquid sweeteners.

Artificial sweeteners may be included in the gum composition of the present invention. If an artificial sweetener is to be used, the preferred sweetener is aspartame, because of its high quality sweetness. Of course other sweeteners such as acesulfame K, sucralose, saccharin, cyclamate and alitame may also be used. The artificial sweetener preferably will have a delayed release property. The delayed release property may be inherent, as with sucralose, or it may result from pretreatment of the sweetener as by spray drying, encapsulation or granulation with suitable materials.

The chewing gum base content of gums of the present invention is preferably higher than in similar gums that do not use the finely ground, powdered bulk sweetener. Preferably base levels in sugar gums are 30% or more. Also, the flavor levels will preferably be higher. The high base content results in a delayed release of the sweetener and liquid flavor. As a result, more flavor is required to provide for sufficient flavor release and for the greater absorption of the flavor by the higher base content. Where a typical sugar gum might contain 20% base and 1% flavor, the same gum utilizing the present invention might contain 25% base and 1.5% flavor. Of course the optimum levels of base and flavor will depend on the specific base and flavor used, as well as other considerations such as the nature and level of other ingredients, desired product properties and cost and processing considerations.

Other standard chewing gum ingredients, such as glycerin, lecithin, fillers and the like, may also be used. When glycerin is used, the chewing gum will preferably contain about 0.5% to about 4% glycerin.

Standard chewing gum production methods, well known to those in the art, may be used with modifications to make chewing gum compositions of the present invention. Allowances may have to be made for the different handling and processing characteristics of the finely ground bulk sweetener. Specifically, the finely ground bulk sweetener may tend to cake and form lumps which can cause handling problems and spots in the finished gum. This problem can be reduced or eliminated by sifting the bulk sweetener just prior to gum manufacture. This sifting may occur up to 24 hours before use if the ambient humidity is low. Presifting will preferably occur as the bulk sweetener is weighed to be added to the mixer, especially in humid conditions. The handling problems may also be reduced or eliminated by preblending an acceptable (non-starch) flow agent, such as fumed silica, into the bulk sweetener. As mentioned previously, starch should be avoided as a flow agent.

Following are several examples of chewing gum compositions of the present invention, including comparisons of the sweetness and flavor lasting for those compositions against gums made of the same formula but with a standard grind sweetener.

EXAMPLE 1

Two gums were prepared according to the following formula:

|  | % (by weight) |
| --- | --- |
| Sucrose | 54.362 |
| Base | 23.989 |
| Dextrose | 13.263 |
| Corn Syrup | 5.074 |
| Glycerin | 1.978 |
| Peppermint Oil | 1.334 |
|  | 100.000 |

One batch was prepared using a conventional sugar grind which passes only 5% through a #325 sieve (Batch 1A). A second batch (Batch 1B) was prepared using a 10×sugar without starch described above which passes at least 75% through a #325 sieve. In a four minute chew by trained panelists, Batch 1A was described as being sweeter and more syrupy initially with less flavor impact and less cooling than Batch 1B.

EXAMPLE 2

Pilot scale batches of chewing gum were made using the following formula.

|  | % (by weight) |
| --- | --- |
| Sugar | 53.755 |
| Base | 24.255 |
| Corn Syrup | 5.130 |
| Glycerin | 2.000 |
| Spearmint Flavor | 1.350 |
| Dextrose Monohydrate | 13.410 |
| 10% Salt Solution | 0.100 |
|  | 100.000 |

Batch 2A used a 10×grind sugar without starch as in the above formula.

Batch 2B used the same formula and a standard grind sugar.

Products from the two batches were compared to Wrigley's Extra ®Spearmint flavor gum in a test using untrained members of the public. Wrigley's Extra ® brand gum is a commercial product which contains encapsulated aspartame and other proprietary ingredients which give the product an exceptionally long lasting flavor and sweetness.

In the test, a large number of frequent gum users compared the product (either Batch 2A or Batch 2B) to Extra ® brand gum in a 12 minute chew. After chewing both samples (in a randomized order) the test participants were asked to state, among other things, which gum had the longer lasting taste and which was sweeter. The participants' responses were analyzed statistically to determine the confidence level, or probability, that the differences in rating were due to real differences in the product, as opposed to random chance. If the confidence level was less than 85%, the samples were considered to be at parity for the attribute under consideration.

Batch 2A (using the present invention) was at parity with Extra ® brand gum in both attributes of "longer lasting taste" and "sweeter". However, Batch 2B, using standard grind sugar, was selected less often than Extra ® brand gum for having either of the desired attributes. For "longer lasting taste", the confidence level was 86%. For "sweeter", the confidence level was 89%.

EXAMPLE 3

Another test was run using the formula of Example 2 except that a different spearmint flavor was used for both batches.

Batch 3A used a 10×sugar without starch.
Batch 3B used a standard grind sugar.

The products were tested against Extra ® Spearmint flavor gum. Batch 3B was tested by the same number of participants as Batches 2A and 2B. Batch 3A was tested by an even larger number of participants to provide greater statistical confidence. Again the results were statistically analyzed.

The inventive Batch 3A was at parity for "longer lasting taste" and "sweeter". Batch 3B, using standard grind sugar, was at parity for "sweeter", but was selected less often than Extra ®brand gum for having "longer lasting taste," with a 99% confidence level.

Thus, the present invention produced a product with long lasting taste and total sweetness perception about equal to a product with expensive encapsulated aspartame for both spearmint flavors tested. On the other hand, the product using the same formula and spearmint flavors, but using a standard grind sugar, was selected less often than the Extra ® brand product for having the longer lasting taste for both flavors, and was at parity for only one flavor, and selected less often for the other flavor, when compared for greater sweetness.

Aside from the statistical considerations, and the fact that the tests were not designed to make head-to-head comparisons between A and B batches, a direct comparison of the test results reveals additional evidence of the effectiveness of the present invention. The percentages of participants choosing the 2A samples as having the "longer lasting taste" compared to Extra ® brand gum was higher than the percentage choosing the 2B sample over Extra ® brand gum. Also, the percentage choosing 2A as being "sweeter" than Extra ® brand gum was higher than the percentage choosing 2B as being "sweeter". Further, the percentages of participants choosing 3A over Extra ® brand gum was higher than the percentages choosing 3B over Extra ® brand gum for both the "longer lasting taste" and "sweeter" attributes.

The reason that the invention works is only speculation at the present time. Without limiting the scope of the invention, the following theory is expressed to help explain the invention. It is believed that some of the finely ground bulk sweetener is more thoroughly incorporated into the gum than a standard grind sweetener, while the portion which is less incorporated into the base is more rapidly solubilized during chewing due to its greater surface-to-weight ratio. (For this reason, the finely ground bulk sweetener must be well mixed into the gum base. While mixing times may have an effect on the invention, standard mixing times are used with the powdered bulk sweeteners disclosed herein.) During chewing, the rapidly solubilized, finely ground bulk sweetener gives a quick sweetness release. The peak sweetener level in the mouth, while relatively high, is less than in conventional gums. However, because perception of sweetness at or near the sensory "saturation" point is asymptotic in relation to sweetness level, the absolute difference in sweetener concentration produces only a minimal difference in perceived sweetness.

Later, when the base-entrapped bulk sweetener is released, the concentration of sweetener is higher than when a standard grind sweetener is used. However, the perceived sweetness improvement is much greater than the increased level of sweetener released due to the high ratio of sweetness perception to actual sweetness at low sweetener levels. Furthermore, it has been found that the perceived sweetness in the late chew is affected by the peak sweetness level in the early chew. The higher the peak, the lower the final sweetness will seem even though the sweetener concentration is the same. This may be a psychological effect wherein the peak level is subconsciously used as a reference to which late sweetness is compared, or it may be a physiological effect caused by fatigue of sweetness receptors by overstimulation which causes them to be less sensitive to the lower stimulation in the late chew. It is possible that a combination of these two causes produces the overall effect.

The invention has the benefit of providing the perception of longer lasting flavor and sweetness without the need for artificial sweeteners and encapsulated flavors. Where such ingredients are desired (for example, to further extend flavor and sweetness), lower levels will suffice. This is important as these sweeteners and encapsulated flavors tend to be expensive and often result in lower quality flavor and sweetness in the final product.

Of course, it should be understood that changes and modifications can be made to the preferred embodiment described above. It is therefore intended that the foregoing detailed description be regarded as illustrative rather than limiting, and that it be understood that it is the following claims, including all equivalents, which are intended to define the scope of this invention.

I claim:

1. A chewing gum composition comprising:
   a) about 5% to about 50% gum base;
   b) about 0.5% to about 3% flavor;
   c) about 40% to about 90% powdered bulk sweetener wherein the powdered bulk sweetener is ground to have a particle size distribution such that at least about 60% of the powdered bulk sweetener passes through a U.S. Standard #325 sieve and the bulk sweetener is essentially free of starch and whereby the particle size of the sweetener provides the gum with longer lasting sweetness without reducing the initial sweetness perception compared to a gum made with the same ingredients except that the sweetener has a larger particle size.

2. The chewing gum of claim 1 wherein the gum base comprises at least 25% of the composition.

3. The chewing gum of claim 1 wherein the gum base comprises at least 30% of the composition.

4. The chewing gum of claim 2 wherein the flavor comprises about 1.5% of the composition.

5. The chewing gum of claim 1 further comprising an artificial sweetener.

6. The chewing gum of claim 5 wherein the artificial sweetener is selected from the group consisting of aspartame, acesulfame K, sucralose, saccharin, cyclamate, alitame and mixtures thereof.

7. The chewing gum of claim 5 wherein the artificial sweetener is provided in a form to yield a delayed release from the gum.

8. The chewing gum composition of claim 1 wherein the powdered bulk sweetener is ground to have a particle size distribution such that at least 70% of the powdered bulk sweetener passes through a U.S. Standard #325 sieve.

9. The chewing gum composition of claim 1 wherein the powdered bulk sweetener has a particle size distribution such that at least 90% of the powdered bulk sweetener passes through a U.S. Standard #325 sieve.

10. The chewing gum composition of claim 1 wherein the powdered bulk sweetener incorporates a non-starch flow agent preblended into the powdered bulk sweetener.

11. The chewing gum composition of claim 10 wherein the flow agent comprises fumed silica.

12. The chewing gum composition of claim 1 wherein the powdered bulk sweetener is selected from the group consisting of sucrose, fructose, xylitol and mixtures thereof.

13. The chewing gum composition of claim 1 wherein the powdered bulk sweetener comprises sucrose.

14. The chewing gum composition of claim 1 further comprising an additional powdered sweetener in addition to the powdered bulk sweetener having a specified particle size.

15. A method of making chewing gum comprising the steps of:
  a) providing a powdered bulk sweetener ground to a particle size distribution such that at least about 60% of the powdered bulk sweetener passes through a U.S. Standard #325 sieve, the bulk sweetener being essentially free of starch, and
  b) mixing about 5% to about 50% gum base, about 0.5% to about 3% flavor and about 40% to about 90% of the powdered bulk sweetener, said percentages being based on the weight of the final composition, to make a chewing gum composition whereby the particle size of the sweetener provides the gum with a longer lasting sweetness without reducing the initial sweetness perception compared to a gum made with the same ingredients except that the sweetener has a larger particle size.

16. The method of claim 15 wherein the powdered bulk sweetener is ground to have a particle size distribution such that at least 70% of the powdered bulk sweetener passes through a U.S. Standard #325 sieve.

17. The method of claim 15 wherein the powdered bulk sweetener is ground to have a particle size distribution such that at least 90% of the powdered bulk sweetener passes through a U.S. Standard #325 sieve.

18. The method of claim 15 further including the step of sifting the powdered bulk sweetener just prior to mixing the powdered bulk sweetener with the gum base.

19. The method of claim 15 further including the step of blending a non-starch flow agent into the powdered bulk sweetener prior to mixing the powdered bulk sweetener with the gum base.

20. A chewing gum composition comprising:
  a) about 20% to about 35% gum base;
  b) about 5% to about 20% dextrose;
  c) about 4% to about 20% corn syrup;
  d) about 0.5% to about 4% glycerin;
  e) about 1% to about 2.5% flavor and
  f) about 45% to about 65% powdered sucrose
ground to a particle size distribution such that at least about 60% of the powdered sucrose passes through a U.S. Standard #325 sieve, said powdered sucrose being essentially free of starch, whereby the particle size of the sweetener provides the gum with a longer lasting sweetness without reducing the initial sweetness perception compared to a gum made with the same ingredients except that the sweetener has a larger particle size.

21. The chewing gum composition of claim 20 wherein the powdered sucrose is ground to have a particle size distribution such that at least 70% of the powdered sucrose passes through a U.S. Standard #325 sieve.

22. The chewing gum composition of claim 20 wherein the powdered sucrose is ground to have a particle size distribution such that at least 90% of the powdered sucrose passes through a U.S. Standard #325 sieve.

* * * * *

UNITED STATES PATENT AND TRADEMARK OFFICE
CERTIFICATE OF CORRECTION

PATENT NO. : 5,133,977
DATED : July 28, 1992
INVENTOR(S) : Mansukh M. Patel

It is certified that error appears in the above-indentified patent and that said Letters Patent is hereby corrected as shown below:

ON THE COVER PAGE:

In the first column of the U.S. PATENT DOCUMENTS, on the third line, delete "10/1971" and substitute therefor --10/1981--.

In column 2, lines 56 and 57, delete "anticaking" and substitute therefor --anti-caking--.

IN THE CLAIMS:

In claim 9, line 2, delete "has" and substitute therefor --is ground to have--.

Signed and Sealed this

Eighteenth Day of October, 1994

Attest:

BRUCE LEHMAN

Attesting Officer    Commissioner of Patents and Trademarks